US009459344B1

(12) United States Patent
Gray et al.

(10) Patent No.: US 9,459,344 B1
(45) Date of Patent: Oct. 4, 2016

(54) SHIP POSITION AND VELOCITY USING SATELLITE EPHEMERIDES AND RADAR RANGE MEASUREMENT OF SATELLITE (75) Inventors: Jack Gray, Point Pleasant, NJ (US); Jonathan A. Boardman, Mount Laurel, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 779 days.

(21) Appl. No.: 13/007,213

(22) Filed: Jan. 14, 2011

(51) Int. Cl.
*G01S 13/06* (2006.01)
*G01S 13/88* (2006.01)

(52) U.S. Cl.
CPC ............. *G01S 13/88* (2013.01); *G01S 13/06* (2013.01)

(58) Field of Classification Search
CPC ........ G01S 19/00; G01S 19/48; G01S 13/06; G01S 13/88
USPC ................. 342/126, 107, 109, 357.2, 357.31
See application file for complete search history.

(56) References Cited

U.S. PATENT DOCUMENTS

| | | | | |
|---|---|---|---|---|
| 3,735,942 | A * | 5/1973 | Palz | 244/172.7 |
| 5,187,485 | A * | 2/1993 | Tsui et al. | 342/357.61 |
| 5,666,122 | A * | 9/1997 | Carter | 342/357.65 |
| 6,133,870 | A * | 10/2000 | Wehner | 342/357.36 |
| 6,246,363 | B1 | 6/2001 | Yung et al. | |
| 6,327,471 | B1 * | 12/2001 | Song | 455/440 |
| 6,327,534 | B1 * | 12/2001 | Levanon et al. | 701/469 |
| 6,650,287 | B1 * | 11/2003 | Karpov et al. | 342/357.3 |
| 6,792,380 | B2 | 9/2004 | Toda | |
| 7,292,185 | B2 | 11/2007 | Whitehead et al. | |
| 7,315,274 | B2 | 1/2008 | Fossum | |
| 7,397,427 | B1 * | 7/2008 | Rhoads et al. | 342/442 |
| 7,451,022 | B1 | 11/2008 | Luk-Paszyc et al. | |
| 7,468,695 | B1 * | 12/2008 | Williams | 342/357.37 |
| 8,186,626 | B1 * | 5/2012 | Liu et al. | 244/158.8 |
| 8,639,629 | B1 * | 1/2014 | Hoffman | 705/67 |
| 2003/0004640 | A1 * | 1/2003 | Vayanos | 701/213 |
| 2003/0043073 | A1 * | 3/2003 | Gray et al. | 342/465 |
| 2003/0150959 | A1 * | 8/2003 | Cleveland | 244/158 R |
| 2007/0252044 | A1 * | 11/2007 | Jackson et al. | 244/165 |
| 2007/0285304 | A1 * | 12/2007 | Cooper | 342/62 |
| 2009/0093959 | A1 | 4/2009 | Scherzinger et al. | |
| 2009/0237302 | A1 * | 9/2009 | Derbez et al. | 342/357.15 |
| 2009/0273515 | A1 * | 11/2009 | Azaola Saenz | 342/357.12 |
| 2009/0315773 | A1 * | 12/2009 | Tomita | 342/357.15 |
| 2010/0019956 | A1 * | 1/2010 | Samaniego et al. | 342/191 |
| 2010/0109944 | A1 | 5/2010 | Whitehead et al. | |
| 2010/0164789 | A1 | 7/2010 | Basnayake | |
| 2010/0226448 | A1 * | 9/2010 | Dent | 375/260 |
| 2011/0084870 | A1 | 4/2011 | Kondo et al. | |
| 2011/0267223 | A1 | 11/2011 | Jin et al. | |

OTHER PUBLICATIONS

P.S. Maybeck, Stochastic Models, Estimation, and Control, vol. 1, Academic Press, p. 1-16, 1979.*
S. Bhattacharya et al., An Evaluation of the Tight Optical Integration (TOI) Algorithm Sensitivity to Inertial and Camera Errors, IEEE/ION Position, Location and Navigation Symposium, p. 533-540, May 2008.*

(Continued)

*Primary Examiner* — Tashiana Adams
*Assistant Examiner* — Fred H Mull
(74) *Attorney, Agent, or Firm* — Howard IP Law Group (57) ABSTRACT

There may be situations in which a ship at sea is lost and GPS is not available due to jamming, and neither a position fix nor GPS is available. A system and method allow estimation of ship position (SPOS) using only single radar range measurements and satellite ephemeris data. The same radar can determine ship velocity using radar range rate information.

16 Claims, 7 Drawing Sheets

(56) References Cited

OTHER PUBLICATIONS

Ship. (2007). In the American Heritage Dictionary of the English Language. Retrieved from http://www.credoreference.com/entry/hmdictenglang/ship.*
Spacecraft. (2007). In the American Heritage Dictionary of the English Language. Retrieved from http://www.credoreference.com/entry/hmdictenglang/spacecraft.*
Salton Sea. (2013). In the Columbia Encyclopedia. Retrieved from http://search.credoreference.com/content/entry/columency/salton_sea/0.*
Sea level. (2013). In the Columbia Encyclopedia. Retrieved from http://search.credoreference.com/content/entry/columency/sea_level/0.*
Originate. (2011). The American Heritage Dictionary of the English Language. Boston, MA: Houghton Mifflin. Retrieved from http://search.credoreference.com/content/entry/hmdictenglang/originate/0.*

* cited by examiner

SHIP POSITION AND VELOCITY USING SATELLITE EPHEMERIDES AND RADAR RANGE MEASUREMENT OF SATELLITE

BACKGROUND

It is important for at least navigational purposes for a moving or movable vehicle to know its position or location. In the case of a ship at sea, there may be situations in which the ship is lost and there are no landmarks in sight. In a battle zone, radio access to Global Positioning System satellites may not be available due to jamming, so that avenue of geolocation is not available.

Improved or alternative arrangements are desired for position and/or velocity determinations.

SUMMARY

A method according to an aspect of the disclosure is for geolocation of a movable platform. The method comprises the steps of operating a radar system mounted on the movable platform to determine the range of at least two satellites, and obtaining ephemerides for the satellites. Using a computer and the satellite ephemerides, range equations are set up which express the geolocation relative to the satellites. Using a computer, a least-squares solution is applied to determine the geolocation. In a particular mode of the method, the step of applying a least-squares solution includes the step of forming an initial estimate of the position. Computer steps are performed of loading satellite ephemeris data, obtaining range measurements to two or more satellites, computing the estimated range based on the estimated user position and satellite ephemeris data, comparing the estimated ranges to the measured ranges, computing a geometry matrix composed of a set of linearized range equations, solving for an incremental position, and updating the overall position estimate. The computer steps are iteratively repeated, and the iterative repeating may be limited to a number of iterations. In one mode in which the number of the satellites for which range measurements are obtained is limited to two, the method further comprises, between the steps of computing a geometry matrix and solving for an incremental position, the step of computing a Jacobian matrix relating ship latitude and longitude to three-dimensional position. According to another aspect of the disclosure, the method may further comprise the steps of operating the radar system mounted on the movable platform to determine the range rate of the satellites in Earth orbit, and using the computer, and from the range rate, the velocity of the satellites as established by the ephemerides, and the lines of sight between the moving platform and the satellites, determining the velocity of the movable platform.

A method according to another aspect of the disclosure is for geolocation of a ship platform, where the ship platform carries a radar system and a computer. The method comprises the steps of, using the radar system, measuring range to at least two Earth satellites, and loading into the computer ephemerides data for the satellites and an estimate as to the position of the platform. The method further comprises the step, using the computer, of calculating the ranges to each satellite from the initial estimate of the position of the platform, to thereby generate calculated ranges, and comparing the measured ranges to the calculated ranges. A geometry matrix is calculated using the computer. An estimate is made, using the computer and the geometry matrix, of the incremental position of the platform. The previous estimate of the position of the platform is updated with the current estimate of the incremental position. A particular mode of this method further comprises the steps of, using the radar system, measuring range rate to the at least two Earth satellites, and computing at least one of (a) latitude and longitude rate and (b) three-dimensional velocity.

A system for geolocation of a movable platform according to an aspect of the invention comprises a radar system mounted on the movable platform and operable to determine the range of at least two satellites in Earth orbit, and a source of ephemerides for the satellites. The system also includes a processor coupled to the radar system and to the source of ephemerides for calculating range equations which express the geolocation of the platform relative to the satellites, and for applying a least-squares solution to determine the geolocation. This system may be supplemented by a system for determining the velocity of a movable platform, which supplemental system comprises a radar system mounted on the movable platform and operable to determine the range rate of at least two satellites in Earth orbit, and also comprises a source of ephemerides for the satellites. A processor, which may be the same processor, is coupled to the radar system and to the source of ephemerides for calculating range equations which express the geolocation of the platform relative to the satellites, for applying a least-squares solution to determine the geolocation, and for, from the range rate, the velocity of the satellites as established by the ephemerides, and the lines of sight between the moving platform and the satellites, determining the velocity of the movable platform.

A system for geolocation of a ship platform according to an aspect of the disclosure comprises a radar system mounted on the ship platform for measuring range to at least two satellites, a source of satellite ephemerides, and a source of estimate of the position of the ship platform. A computer is coupled to the radar, to the source of satellite ephemerides, and to the source of estimate, for (a) using the computer, calculating the ranges to each satellite from an estimate of the position of the platform, to thereby generate calculated ranges, (b) comparing the measured ranges to the calculated ranges, (c) calculating a geometry matrix, (d) using the geometry matrix, making a new estimate of the incremental position of the platform, and (e) and updating the estimate with the new estimate of position of the platform with the current estimate of the incremental position. Another embodiment of the system is further for determining the range rate of the satellites in Earth orbit, and in this other embodiment, the computer, if further for, from the range rate, the velocities of the satellites as established by the ephemerides, and the lines of sight between the ship and the satellites, determining the velocity of the movable platform.

DETAILED DESCRIPTION

Figure 1:
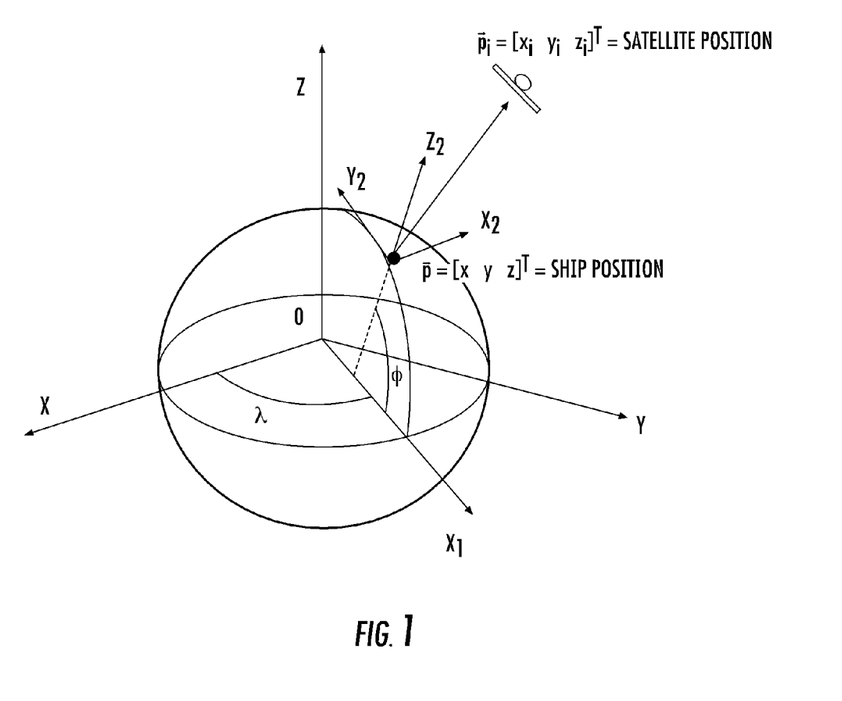
FIG. 1 illustrates geometry which may be used in conjunction with the prior-art Global Positioning System (GPS) for determining geolocation.

The prior-art Global Positioning System allows determination of geolocation. If four satellite-to-user ranges are available, position can be determined. GPS has shown that geolocation can be accomplished by having satellites transmit radio signals to a user's receiver. The satellite-to-user range is based on measuring the time of flight of a Radio Frequency (RF) signal that leaves the satellite transmitter at a time t=t1 and arrives at the user at time t=t2. In that case, the range $\rho=c(t2-t1)$ where c is the speed of light. Given four satellite-to-user ranges, user x, y, and z location or position can be solved for as set forth by the geometry of FIG. 1 and calculations well known to those skilled in the art. In FIG. 1, XYZ represents the ECEF (Earth-Centered-Earth-Fixed) coordinate frame, $X_2Y_2Z_2$ represents the ENU (East-North-Up) frame. The various satellite positions are designated as $\vec{p}_i=[x_i \ y_i \ z_i]^T$ and the ship or platform position is $\vec{p}=[x \ y \ z]^T$.

The Ship Position (SPOS) method according to an aspect of the disclosure differs from GPS in that (1) It is not necessary to use GPS satellites, any satellites can be used, whose ephemerides are known;

(2) The ranges between satellites and the user position are determined by a radar system, which of course must be capable of measuring these ranges; and (3) In the case of GPS, four satellites are required to determine position because the clock bias b is modeled in the state vector. SPOS uses clock bias corrected range measurements from the radar, so a minimum of three satellites are required to determine the three-dimensional user position. In a special case, only two satellites may be used.

Since position accuracy is dependent on satellite geometry, a geometry matrix, G, is created which depends on satellite-to-user or satellite-to-platform geometry. From matrix G, Position Dilution of Precision (PDOP) is calculated. This is a measure which characterizes the quality of a position estimate in terms of the user-to-satellite geometry.

Figure 2:
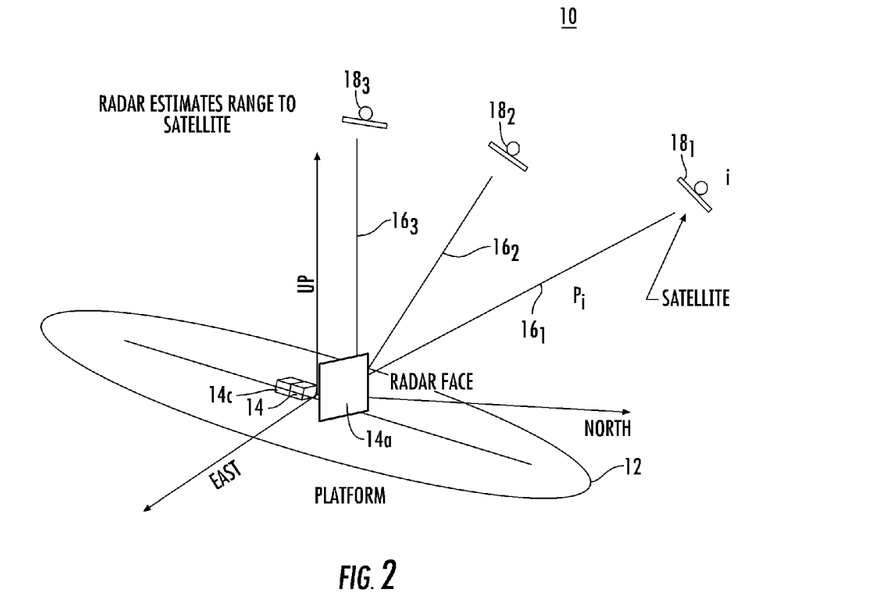
FIG. 2 is a simplified representation of a ship at sea illuminating a plurality of satellites with a radar system, and including a computer, for Ship Position (SPOS) or velocity determination.

FIG. 2 illustrates geometry associated with a ship 12 at sea 10. In FIG. 2, ship 12 includes a radar system, part of which is designated 14, and an antenna portion of which is designated 14a. A computer illustrated as 14c aids in performing radar, position, velocity, and related computations. Radar system 14 is illustrated as generating radar "beams" $16_1$, $16_2$, and $16_3$ directed toward satellites $18_1$, $18_2$, and $18_3$, respectively, which happen to be in view at the illustrated time. These beams allow the range $\rho$ of the satellite from the ship to be determined in known fashion. As illustrated in FIG. 2, the range from ship 12 to satellite $18_1$ is determined to be $\rho_1$.

The range between satellite i and the user or ship in FIG. 2 can be expressed as $$\rho_i = \|\vec{p}-\vec{p}_i\| = \sqrt{(x-x_i)^2+(y-y_i)^2+(z-z_i)^2} \quad \text{Eq. 1}$$

Where $\vec{p}=[x \ y \ z]^T$ and $\vec{p}_i=[x_i \ y_i \ z_i]^T$ are the unknown user position and the known satellite position with respect to the X, Y and Z axes, respectively. This is a non-linear equation in three unknowns, so at least three range measurements are necessary to solve for the position. One approach to solving for the user position is to linearize the range equations about an initial guess of the position, and to solve iteratively. The initial guess is $\hat{p}=[\hat{x} \ \hat{y} \ \hat{z}]^T$, where the true position components can be expressed as $x=\hat{x}+\delta x$, $y=\hat{y}+\delta y$, and $z=\hat{z}+\delta z$. Using this estimate of the position, an estimated range can be calculated using Equation 2, which is of the form $\hat{\rho}_i=\hat{\rho}(\hat{x},\hat{y},\hat{z})$.

$$\hat{\rho}_i=\sqrt{(\hat{x}-x_i)^2+(\hat{y}-y_i)^2+(\hat{z}-z_i)^2} \quad \text{Eq. 2}$$

From multi-variable calculus, we know that the variation for a function f can be written as follows $$\delta f(x,y,z) = \frac{\partial f}{\partial x}\delta x + \frac{\partial f}{\partial y}\delta y + \frac{\partial f}{\partial z}\delta z \quad \text{Eq. 3}$$

Therefore, the variation in the range in Equation 1 will have the form $$\delta\hat{\rho}_i = \frac{\partial \hat{\rho}_i}{\partial \hat{x}}\delta\hat{x} + \frac{\partial \hat{\rho}_i}{\partial \hat{y}}\delta\hat{y} + \frac{\partial \hat{\rho}_i}{\partial \hat{z}}\delta\hat{z} \quad \text{Eq. 4}$$

Since we can say $\delta\hat{x}=\delta x$, and $\delta\hat{y}=\delta y$, and $\delta\hat{z}=\delta z$, Equation 4 can be re-written as equation 5

$$\delta\hat{\rho}_i = \frac{\partial \hat{\rho}_i}{\partial \hat{x}}\delta x + \frac{\partial \hat{\rho}_i}{\partial \hat{y}}\delta y + \frac{\partial \hat{\rho}_i}{\partial \hat{z}}\delta z \quad \text{Eq. 5}$$

Applying Equation 5 to range equation (2) results in an equation linearized about the initial guess, relating the differential user position to the differential range.

$$\delta\hat{\rho}_i = \frac{1}{2}[(\hat{x}-x_i)^2+(\hat{y}-y_i)^2+(\hat{z}-z_i)^2]^{-\frac{1}{2}} \cdot 2(\hat{x}-x_i)\cdot\delta x + \ldots$$

$$\frac{1}{2}[(\hat{x}-x_i)^2+(\hat{y}-y_i)^2+(\hat{z}-z_i)^2]^{-\frac{1}{2}} \cdot 2(\hat{y}-y_i)\cdot\delta y + \ldots$$

$$\frac{1}{2}[(\hat{x}-x_i)^2+(\hat{y}-y_i)^2+(\hat{z}-z_i)^2]^{-\frac{1}{2}} \cdot 2(\hat{z}-z_i)\cdot\delta z \quad \text{Eq. 6}$$

Two approaches can be taken to obtaining a position solution. The first approach is for the case in which there are three or more range measurements, the second is for the second case, in which only two range measurements are available. In this second case an approximate position can be obtained by applying the constraint that the user is located on the ellipsoid approximating the Earth's surface.

Figure 3A:
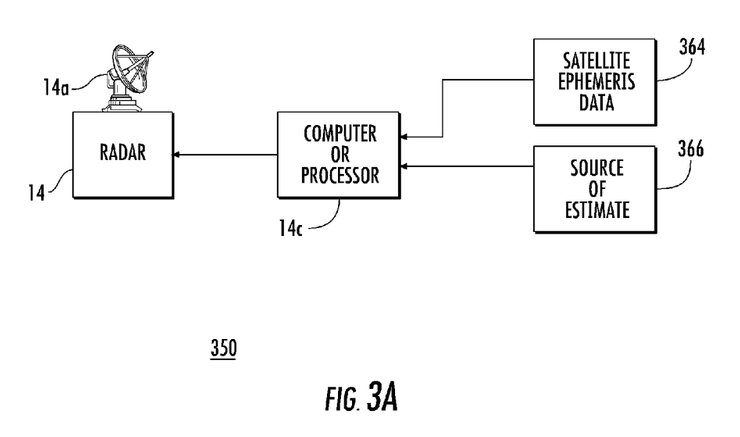
FIG. 3A is a simplified block diagram of a system according to an aspect of the disclosure.

FIG. 3A is a simplified block diagram of a system 350 according to an aspect of the disclosure for performing geoposition determination, with or without velocity determination. In FIG. 3A, a mobile platform 350, which may be a ship or other vehicle, includes a radar system 14 with an antenna 14a, for tracking satellite ranges and, in some embodiments, range rates. The system also includes a computer or processor 14c coupled for receiving satellite range and range rate from the radar system 360. A source of satellite ephemeris information or data is illustrated as a block 364 coupled to the computer 14c. Block 364 may be a memory, or it may include a transmission path (not illustrated) to an originating source of ephemeris data. A block 366 represents a source of initial estimated position, which computer 14c can use for initiating computations.

The general Ship Position (SPOS) algorithm for the case in which three or more range measurements are available (thereby requiring that there be three or more Earth satellites on which to perform measurements) begins with the observation that, For N (N≥3) range measurements, and N is the total number of satellites, Equation (3) can be expressed in vector notation as $$\begin{bmatrix} \rho_1 - \hat{\rho}_1 \\ \rho_2 - \hat{\rho}_2 \\ \vdots \\ \rho_N - \hat{\rho}_N \end{bmatrix} = \begin{bmatrix} \frac{(\hat{x}-x_1)}{\hat{\rho}_1} & \frac{(\hat{y}-y_1)}{\hat{\rho}_1} & \frac{(\hat{z}-z_1)}{\hat{\rho}_1} \\ \frac{(\hat{x}-x_2)}{\hat{\rho}_2} & \frac{(\hat{y}-y_2)}{\hat{\rho}_2} & \frac{(\hat{z}-z_2)}{\hat{\rho}_2} \\ \vdots & \vdots & \vdots \\ \frac{(\hat{x}-x_N)}{\hat{\rho}_N} & \frac{(\hat{y}-y_N)}{\hat{\rho}_N} & \frac{(\hat{z}-z_N)}{\hat{\rho}_N} \end{bmatrix} \begin{bmatrix} \delta x \\ \delta y \\ \delta z \end{bmatrix} \quad \text{Eq. 7}$$

where $\delta\hat{\rho}_i \equiv \rho_i - \hat{\rho}_i$ and $\delta\hat{\rho} \equiv \delta\rho$
or $$\delta\hat{p} = G\delta\vec{p} \quad \text{Eq. 8}$$

The matrix G is referred to as the geometry matrix. Its rows are the negative of the line-of-sight unit vectors pointing from the estimated user position to each satellite. It can also be expressed more conveniently as $$G = \begin{bmatrix} -l\hat{o}s_1^T \\ -l\hat{o}s_2^T \\ \vdots \\ -l\hat{o}s_N^T \end{bmatrix} \quad \text{Eq. 9}$$

Figure 3B:
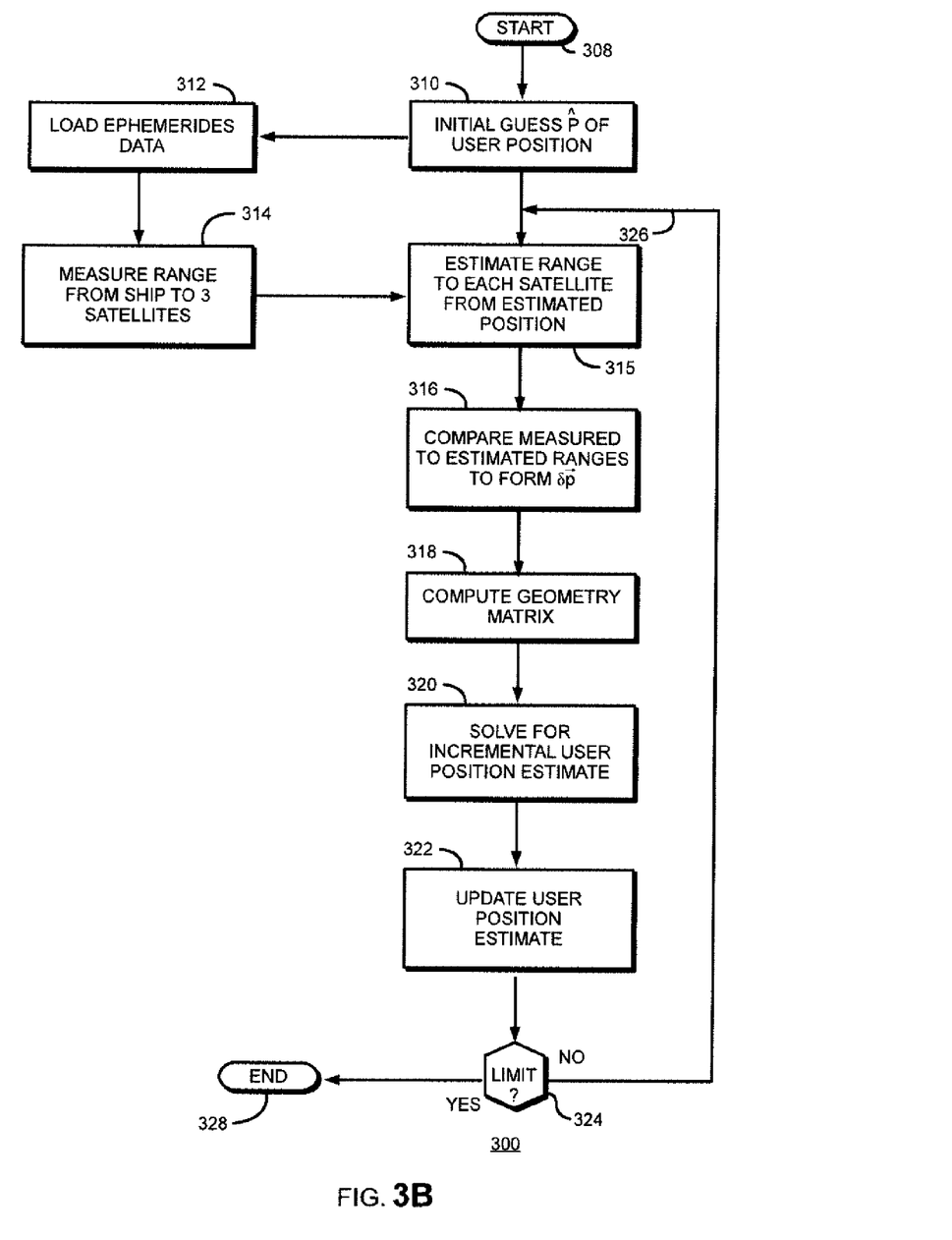
FIG. 3B is a simplified logic flow chart or diagram illustrating some SPOS steps according to an aspect of the disclosure when the ranges to three or more satellites can be measured.

Equation 7 represents a linear system of equations with many well known solutions. Expressing the equations in linear form also extends to an easy error analysis. Because the measurements are imperfect and because N (the number of range measurements) may be more than 3, there will generally not be a solution that fits all of the equations. An optimal approximate solution can be determined, which is the best fit for the available information. The optimal solution in a least-squares sense can be determined using $$\delta\vec{p} = (G^T W^{-1} G)^{-1} G^T W^{-1} \delta\vec{\rho} \quad \text{Eq. 10}$$

Where W is a weight matrix used in case certain, more accurate measurements are to be favored over others. Weight W is generally selected as the covariance of the range measurements $$W = \text{diag}[\sigma_1^2 \sigma_2^2 \ldots \sigma_3^2] \quad \text{Eq. 11}$$

Where $\sigma_i^2$ represents the uncertainty in the range measurement for satellite i. Because the range equations (from Equation 2) have been linearized, obtaining a solution is an iterative process. FIG. 3B is a simplified logic 300 flow chart or diagram illustrating the steps of the iterative process to obtain position or location with three or more range measurements, which implies three or more visible satellites. In FIG. 3B, the logic 300 begins at a START block 308, and flows to a block 310, which represents generating an initial guess or estimate $\hat{p}$ as to the user position.

$$\hat{p} = \begin{bmatrix} \hat{x} \\ \hat{y} \\ \hat{z} \end{bmatrix} \quad \text{Eq. 12}$$

Using an initial guess of $\hat{p} = [0\ 0\ 0]^T$ of should be sufficient for most applications. From block 310, the logic 300 flows to a block 312, representing loading into the computer satellite ephemerides data. From block 312, logic 300 flows to a block 314. Block 314 represents measurement of the range from ship to satellites using the radar. From block 314, the logic flows to a block 315. Block 315 represents calculation of the estimated range from the estimated position to each satellite i=1 through I=N $$\vec{\rho}_i = \sqrt{(\hat{x}-x_i)^2 + (\hat{y}-y_i)^2 + (\hat{z}-z_i)^2} \quad \text{Eq. 13}$$

Block 316 represents comparison of the measured ranges to the estimated ranges for each satellite to form $$\delta\vec{\rho}$$

$$\delta\vec{\rho} = \begin{bmatrix} \rho_1 - \hat{\rho}_1 \\ \rho_2 - \hat{\rho}_2 \\ \vdots \\ \rho_N - \hat{\rho}_N \end{bmatrix} \quad \text{Eq. 14}$$

From block 316, the logic 300 flows to a block 318. Block 318 represents computation of the Geometry Matrix G as shown in equation (9)

$$G = G(\hat{x}, \hat{y}, \hat{z}) \quad \text{Eq. 15}$$

From block 318, the logic 300 flows to a block 320. Block 320 represents solving for incremental user position.

$$\delta\vec{p} = (G^T W^{-1} G)^{-1} G^T W^{-1} \delta\vec{\rho} \quad \text{Eq. 16}$$

Block 322 represents updating of the user position estimate $$\hat{p}^+ = \hat{p}^- + \delta\hat{p} \quad \text{Eq. 17}$$

From block 322, the logic 300 of FIG. 3B flows to a decision block 324, which determines if the iterations should continue, either by counting the total number of iterations or by comparing the change in position estimate with a threshold value. If the iteration limit has not been reached, the logic flows by a return logic path 326 back to block 315, in which the ranges to the satellites are again determined from the newly updated position. If the iteration limit has been reached, the logic leaves decision block 324 by the YES output and flows to an END block. The iterative solution will often converge in three to four iterations, but more iterations may be used to provide some assurance of convergence. Thus, the process of solving for the user position involves developing a linear model for the range equations, starting with an initial guess, and iteratively making the model fit the range measurements.

Velocity can be determined as part of, or in conjunction with, the ship position (SPOS) determination described in conjunction with FIG. 3B. Relative motion between the satellite and the ship or user results in changes in the observed frequency of the return signal. This is the Doppler shift, which is measured by the radar. Given the velocity of the satellite, known from ephemeris data, and the Doppler shift, the user velocity can be determined. The Doppler shift is equivalent to the range rate and is the projection of the relative velocity onto the line of sight between the user and satellite, as set forth in Equation (18).

$$\dot{\rho}_i = (\vec{v}_i - \vec{v}) \cdot \hat{los}_i + \epsilon_i \qquad \text{Eq. (18)}$$

where:

$\vec{v}$ is the user velocity to be solved for;

$\vec{v}_i$ is the satellite velocity, known from ephemeris data;

$\hat{los}_i$ is the line-of-sight unit vector pointing from the user position to satellite i; and $\epsilon_i$ includes error associated with measuring the phase.

Equation (18) can be re-written as $$\dot{\rho}_i - \vec{v}_i \cdot \hat{los}_i = -\vec{v} \cdot \hat{los}_i + \epsilon_i \qquad \text{Eq. 19}$$

By defining $\tilde{\dot{\rho}}_i \equiv \dot{\rho}_i - \vec{v}_i \cdot \hat{los}_i$, the combined set of measurements from N satellites can be written as $$\tilde{\dot{\rho}} = G\vec{v} + \vec{\epsilon} \qquad \text{Eq. 20}$$

The velocity solution can then be obtained as:

$$\vec{v} = (G^T W^{-1} G)^{-1} G^T W^{-1} \tilde{\dot{\rho}} \qquad \text{Eq. 21}$$

As mentioned, it is possible to generate a ship position (SPOS) solution using Two Range Measurements for the Ship-at-Sea Case. Most positioning systems require at least three range measurements to solve for the three-dimensional user position. However, applying the additional constraint that the user is located on the ellipsoid approximating the Earth's surface results in a solution containing only two free variables, namely Latitude $\phi$ and Longitude $\lambda$ as illustrated in FIG. 1.

In FIG. 1, XYZ represents the ECEF (Earth-Centered-Earth-Fixed) coordinate frame, $X_2Y_2Z_2$ represents the ENU (East-North-Up) frame. For sea-based applications, the user is located at sea-level and, in many cases, the height relative the ellipsoid at given latitude and longitude may be obtained from survey data. The position vector on the WGS-84 (World Geographical Survey—1984) ellipsoid, with altitude set to zero is $$\vec{p} = \begin{bmatrix} x \\ y \\ z \end{bmatrix} = R_n \begin{bmatrix} \cos\phi\cos\lambda \\ \cos\phi\sin\lambda \\ (1-\varepsilon^2)\sin\phi \end{bmatrix} \qquad \text{Eq. 22}$$

$$R_n \equiv \frac{a}{\sqrt{1 - \varepsilon^2 \sin^2\phi}} \qquad \text{Eq. 23}$$

where:

a=6,378,137 Meters and is the semi-major axis of Earth; and $\varepsilon$=0.0833 and is the first eccentricity of the Earth.

The variation in the position will have the form $$\delta\vec{p} = \begin{bmatrix} \frac{\partial x}{\partial \phi} & \frac{\partial x}{\partial \lambda} \\ \frac{\partial y}{\partial \phi} & \frac{\partial y}{\partial \lambda} \\ \frac{\partial z}{\partial \phi} & \frac{\partial z}{\partial \lambda} \end{bmatrix} \begin{bmatrix} \delta\phi \\ \delta\lambda \end{bmatrix} \qquad \text{Eq. 24}$$

or $$\delta\vec{p} = J\delta\vec{\theta} \qquad \text{Eq. 25}$$

where J is a Jacobian matrix which represents the mapping of differential latitude and longitude to differential position. $\delta\theta = [\delta\phi \; \delta\lambda]^T$ is a vector containing the differential latitude and longitude. J can be calculated using Equations (15) and (17).

$$J = \begin{bmatrix} -R_n\cos\lambda\sin\phi + \cos\phi\cos\lambda\frac{\partial R_n}{\partial \phi} & -R_n\cos\phi\sin\lambda \\ -R_n\sin\lambda\sin\phi + \cos\phi\sin\lambda\frac{\partial R_n}{\partial \phi} & R_n\cos\phi\cos\lambda \\ (1-\varepsilon^2)\left(R_n\cos\phi + \sin\phi\frac{\partial R_n}{\partial \phi}\right) & 0 \end{bmatrix} \qquad \text{Eq. 26}$$

where $$\frac{\partial R_n}{\partial \phi} = \frac{a\varepsilon^2 \sin\phi\cos\phi}{(1 - \varepsilon^2 \sin^2\phi)^{\frac{3}{2}}} \qquad \text{Eq. 27}$$

Substituting Equation (5) into Equation (24) results in the relation $$\delta\vec{\rho} = GJ\delta\vec{\theta} \qquad \text{Eq. 28}$$

The optimal algorithm in a least squares sense can be determined by:

$$\delta\vec{\theta} = (J^T G^T W^{-1} GJ)^{-1} J^T G^T W^{-1} \delta\vec{\rho} \qquad \text{Eq. 29}$$

where, as mentioned, $\delta\theta = [\delta\phi \; \delta\lambda]^T$ is a vector containing the differential latitude and longitude.

Figure 4:
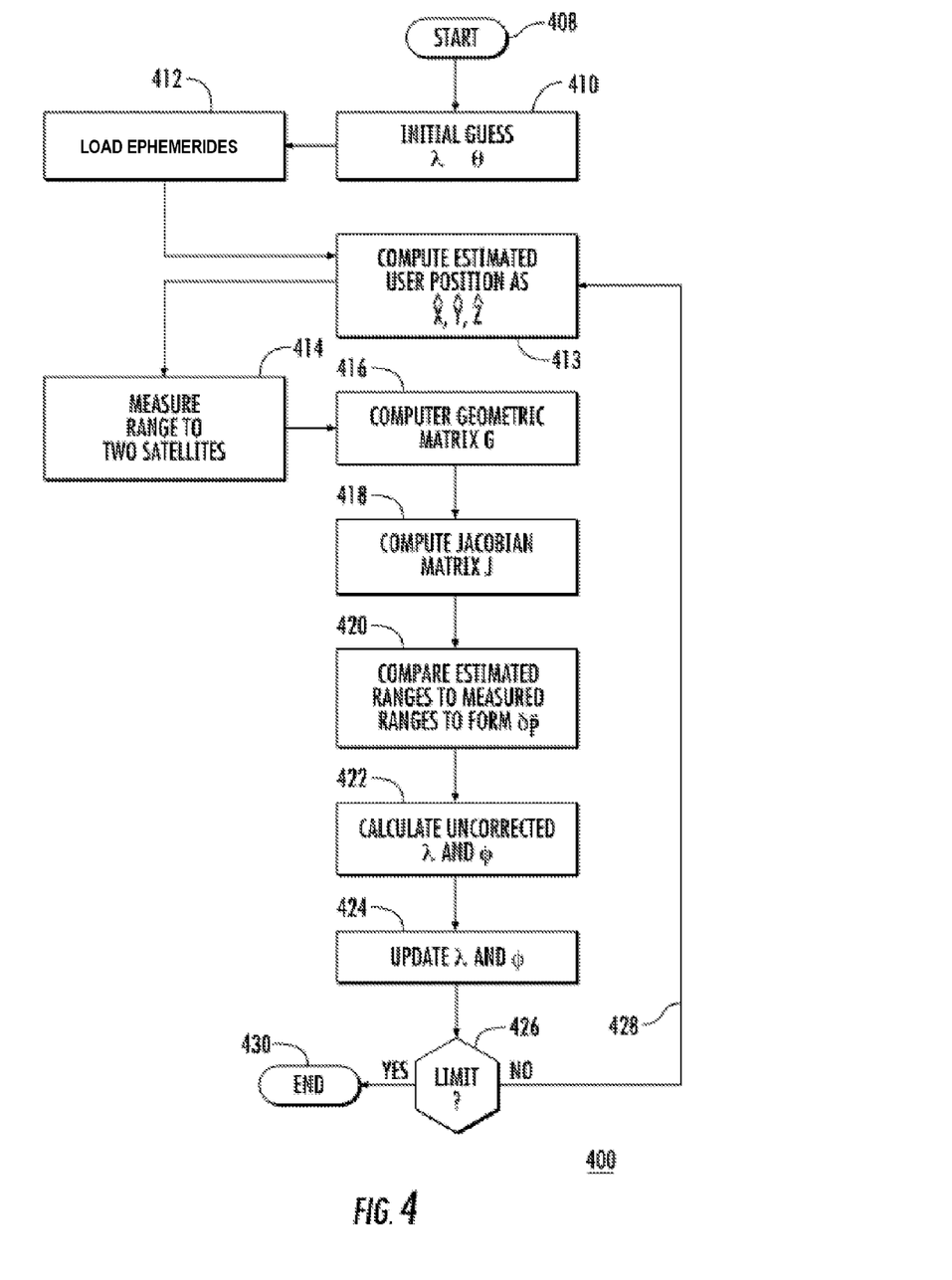
FIG. 4 is a simplified logic or control flow chart or diagram illustrating steps according to an aspect of the disclosure when the ranges to only two satellites can be measured.

FIG. 4 is a simplified logic or control flow chart or diagram illustrating steps in determining geolocation of a movable platform from measurements on only two satellites. A solution for the latitude and longitude are obtained in a similar manner to the solution for position set forth above. The logic 400 of FIG. 4 begins at a START block 408, and flows to a further block 410. Block 410 represents an initial estimate or guess $\hat{\theta}$ as to latitude $\lambda$ and longitude $\phi$ $$\hat{\theta} = \begin{bmatrix} \hat{\phi} \\ \hat{\lambda} \end{bmatrix} \qquad \text{Eq. 30}$$

It should be noted that the usage of Greek symbols $\lambda$ and $\phi$ to represent latitude and longitude, respectively, is not universal. From block 410, the logic 400 flows to a block 412. Block 412 represents the loading of ephemerides information. Block 413 represents computation of the estimated user position based on the estimated latitude and longitude $$\hat{p} = \begin{bmatrix} \hat{x} \\ \hat{y} \\ \hat{z} \end{bmatrix} = \frac{a}{\sqrt{1 - \varepsilon^2 \sin^2\hat{\phi}}} \begin{bmatrix} \cos\hat{\phi}\cos\hat{\lambda} \\ \cos\hat{\phi}\sin\hat{\lambda} \\ (1-\varepsilon^2)\sin\hat{\phi} \end{bmatrix} \qquad \text{Eq. 31}$$

From block 413, logic 400 flows to a block 414. Block 414 represents the measurement of the ranges to the two satellites. From block 414, the logic 400 flows to a block 416. Block 416 represents computation of the Geometry matrix G as described in conjunction with Equation (9)

$$G = G(\hat{x}, \hat{y}, \hat{z}) \quad \text{Eq. 32}$$

From block 416, logic 400 flows to a block 418. Block 418 represents the computation of the Jacobian matrix J as described in conjunction with Equation 25

$$J = J(\hat{\phi}, \hat{\lambda}) \quad \text{Eq. 33}$$

From block 418, logic 400 flows to a block 420. Block 420 represents comparison of measured ranges to estimated ranges to form $\delta\vec{\rho}$ $$\delta\vec{\rho} = \begin{bmatrix} \rho_1 - \hat{\rho}_1 \\ \rho_2 - \hat{\rho}_2 \end{bmatrix} \quad \text{Eq. 34}$$

From block 420, the logic 400 of FIG. 4 flows to a block 422. Block 422 represents calculation of incremental latitude and longitude $$\delta\vec{\theta} = (J^T G^T W^{-1} G J)^{-1} J^T G^T W^{-1} \delta\vec{\rho} \quad \text{Eq. 35}$$

From block 422, logic 400 flows to a block 424. Block 424 represents the updating of the latitude and longitude estimates $$\hat{\phi}^+ = \hat{\phi}^- + \delta\phi$$

$$\hat{\lambda}^+ = \hat{\lambda}^- + \delta\lambda \quad \text{Eq. 36}$$

Logic 400 flows from block 424 to a decision block 426, which determines if a limit number of iterations has been completed. If not, the logic leaves decision block 426 by the NO output, and flows by a logic path 428 back to block 413 to begin another iteration. If the limit has been reached, the logic flows from the YES output of block 426 to an END block 430. The decision may be based on a fixed number of iterations or on convergence. The geolocation is deemed to be the updated latitude and longitude estimates at the end of the iterations.

The horizontal velocity for the two-satellite case can be determined using the matrix J and the velocity relation derived previously, Eq. 15.

$$\dot{\vec{\rho}} = G J \vec{\theta} + \vec{\epsilon} \quad \text{Eq. 37}$$

where $\vec{\theta} = [\dot{\phi} \, \dot{\lambda}]^T$ is a vector containing the Latitude rate and Longitude rate in radians/second. The North and East components of the user velocity can be obtained as follows:

$$v_N = \dot{\phi} R_n \quad v_E = \frac{\dot{\lambda} R_n}{\cos\phi} \quad \text{Eq. 38}$$

Figure 5:
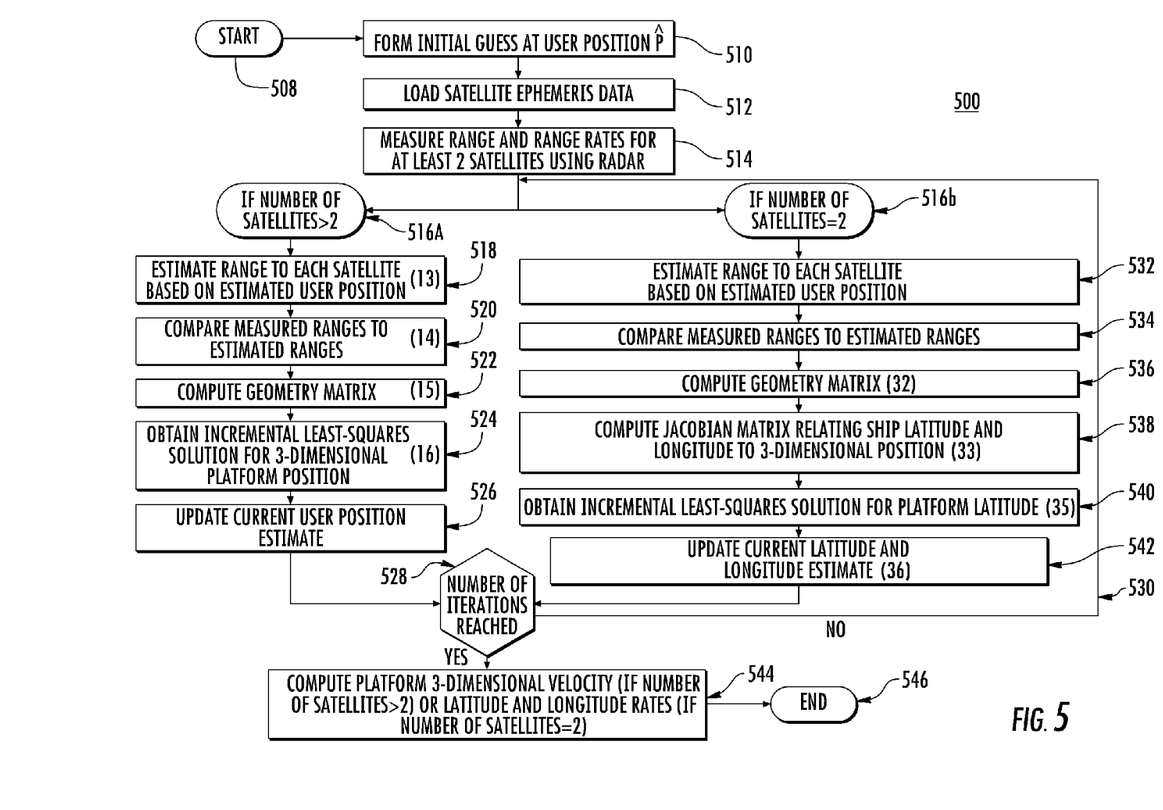
FIG. 5 is an overall logic or control flow chart or diagram illustrating overall logic for SPOS.

FIG. 5 is a simplified logic or control flow chart or diagram representing the overall logic flow 500 for determining ship position (SPOS). In FIG. 5, the logic begins at a START block 508, and proceeds to a block 510. Block 510 represents the formation of an initial guess at user position, equation 12. From block 510, the logic 500 flows to a block 512. Block 512 represents the loading of satellite ephemerides data. Block 514 represents measuring the range for at least two satellites, and range rates if ship velocity is to be determined. From block 514, the logic flows to a decision block 516, shown in two parts designated 516a and 516b. Decision block 516 routes the logic depending upon the number of satellites for which measurements have been made. If the number of satellites is three or more, block 516a routes the logic to a block 518. If the number of satellites is two, block 516b routes the logic to a block 532. Block 518 in the three-or-more flow path represents the formation of the estimated range to each satellite based on the current estimate of the user position, equation 13. From block 518, the logic flows to a block 520, representing the comparing of the estimated range to the measured range as shown in equation 14. From block 520, the logic flows to block 522, which represents the formation of the geometry matrix shown in equation 15. From 522, the logic flows to block 524, which represents the obtainance of an incremental least-squares solution, equation 16. From block 524, the logic flows to a block 526, which represents the updating of the current position measurement, Equation 17. From block 526, the logic flows to a decision block 528, which routes the logic by way of a path 530 back to decision block 516 if the selected number of iterations has not been reached.

If the number of satellites on which measurements are made in FIG. 5 is two, the logic 500 is routed by decision block 516b to a block 532. Block 532 represents estimating the range to each of the satellites based on the current estimated user position, as described previously (Equation 13). From block 532, the logic 500 flows to a block 534, representing the comparing of the estimated range to the measured range as shown previously (Equation 13). From block 534, the logic 500 flows to a block 536. Block 536 represents computation of the geometry matrix, as shown in equation 32. From block 536, the logic 500 flows to a block 538. Block 538 represents computation of the Jacobian matrix relating ship latitude and longitude to a three-dimensional position equation (Equation 33). Block 540 represents obtainance of an incremental least-squares solution for platform latitude and longitude (Equation 35). Block 542 represents the updating of the current Latitude and Longitude estimates, equation 36. Decision block 528 performs the same function of re-iterating the flow through the logic if the number of iterations has not reached the limit. The logic 500 of FIG. 5 reaches block 544 by either the three-or-more-satellite path or the two-satellite path. Block 544 represents the calculation of the three-dimensional velocity in the case of a number of range measurements greater than two (equation 21), and to obtain user velocity in East and North directions if the number of range measurements is equal to two. From block 544, the logic 500 flows to a block 546. Block 546 represents the ending state of the logic 500, namely with platform three-dimensional position and velocity if the number of range measurements exceeds two, and with platform latitude and longitude, and platform velocity in East and North directions if the number of range measurements equals two.

Figure 6:
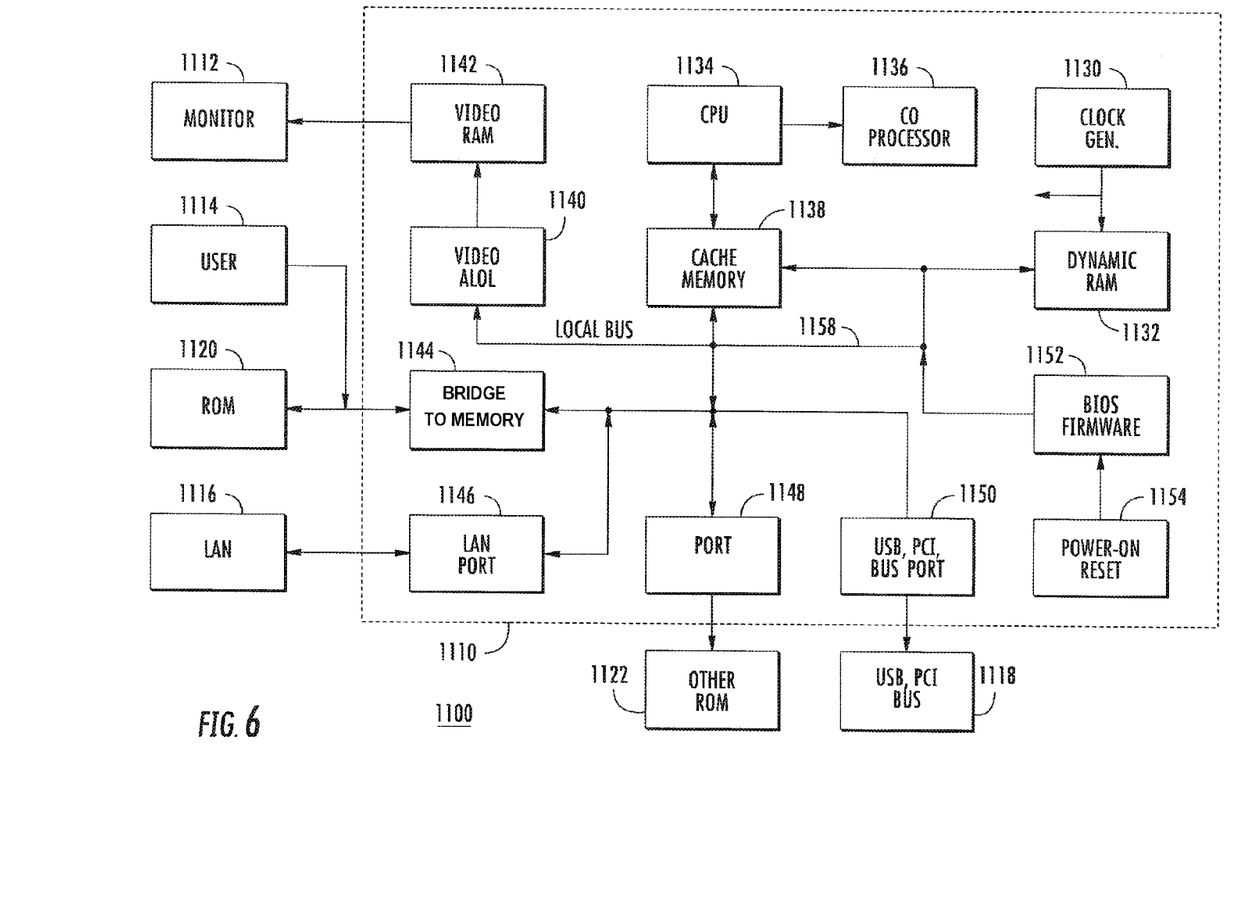
FIG. 6 is a simplified functional block diagram illustrating a computer which may be used for SPOS calculations aboard a vehicle.

FIG. 6 is a simplified diagram in block and schematic form illustrating a representative computer which may be used as 14c. In FIG. 11, computer 1100 includes a processor or board 1110 and outboard elements such as a monitor 1112, user controls such as a keyboard and/or mouse, illustrated as a block 1114, local area network (LAN) 1116, additional buses 1118 such as PCI and/or USB, and read-only memory (ROM) 1120, which is ordinarily a hard drive, and additional ROM 1122, which may be, for example, a flash memory stick or capacitance disk (CD). The main portion of the computer processor or board 1110 includes a central processing unit (CPU) 1134, which communicates with a cache dynamic memory 1138. At initial turn-on of the computer 1100, a power-on reset illustrated as a block 1154 enables a preloaded basic input/output system (BIOS) flash memory, which loads cache 1138 with information that initializes the booting sequence by the CPU. When booted, CPU 1134 may communicate with a coprocessor illustrated as 1136, and also communicates with main dynamic memory (DRAM) 1132 and a local bus 1158. Local bus 1158 provides communication between the CPU and other elements of the computer, as for example the video processor 1140 and video random-access memory 1142 for driving a monitor. Local bus 1158 also communicates by way of a bridge 1144 to external ROM 1120 and to user controls 1118. Local bus 1158 further communicates by way of a port 1148 with other ROM 1122 if desired, by way of a USB or PCI bridge or port 1150 with external buses, and/or by way of a local area network (LAN) port 1146 with a LAN 1116. Those skilled in the art will understand how to use one or more computers to perform the processing required by elements of the disclosure.

A method according to an aspect of the disclosure is for geolocation of a movable platform (12). The method comprises the steps of operating a radar system (14, 14a) mounted on the movable platform (12) to determine the range (314, 414, 514) of at least two satellites (18) in Earth orbit, and obtaining ephemerides (312, 412, 512) for the satellites (18). Using a computer (14c) and the satellite ephemerides, range equations are set up which express the geolocation relative to the satellites. Using a computer (14c), a least-squares solution is applied to determine the geolocation. In a particular mode of the method, the step of applying a least-squares solution includes the step of forming an initial estimate of the position (310, 410, 510). Computer steps are performed of loading satellite ephemeris data (312, 412, 512), obtaining range measurements (314, 414, 514) to two or more satellites, computing the estimated range based on the estimated user position and satellite ephemeris data (315, 518, 532), comparing the estimated ranges to the measured ranges (316, 520, 534), computing a geometry matrix composed of a set of linearized range equations (318, 416, 522, 536), solving for an incremental position (320, 422, 524, 540), updating the overall position estimate (322, 424, 526). The computer steps (324, 426, 528) are iteratively repeated, and the iterative repeating may be limited to a number of iterations. In one mode in which the number of the satellites for which range measurements are obtained is limited to two, the method further comprises, between the steps of computing a geometry matrix (536) and solving for an incremental position (540), the step of computing a Jacobian matrix (538) relating ship latitude and longitude to three-dimensional position. According to another aspect of the disclosure, the method may further comprise the steps of operating the radar system (14) mounted on the movable platform (12) to determine the range rate of the satellites (18) in Earth orbit, and using the computer (14c), and from the range rate, the velocity of the satellites as established by the ephemerides, and the lines of sight between the moving platform and the satellites, determining (544) the velocity of the movable platform.

A method according to another aspect of the disclosure is for geolocation of a ship platform (12), where the ship platform carries a radar system (14) and a computer (14c). The method comprises the steps of, using the radar system (14c), measuring range (314, 414, 514) to at least two Earth satellites (18), and loading (312, 412, 512) into the computer (14c) ephemerides data for the satellites (18) and an estimate as to the position of the platform. The method further comprises the step, using the computer, of calculating (315, 518, 532) the ranges to each satellite (18) from the initial estimate of the position of the platform, to thereby generate calculated ranges, and comparing (316, 420, 520, 534) the measured ranges to the calculated ranges. A geometry matrix is calculated (318, 415, 522, 536) using the computer (14c). An estimate is made, using the computer and the geometry matrix (320, 422, 524, 540) of the incremental position of the platform (12). The previous estimate of the position of the platform (12) is updated (322, 424, 526, 542) with the current estimate of the incremental position. A particular mode of this method further comprises the steps of, using the radar system (14c), measuring range rate (514) to the at least two Earth satellites (18), and computing at least one of (a) latitude and longitude rate and (b) three-dimensional velocity.

A system for geolocation of a movable platform (12) according to an aspect of the invention comprises a radar system (14) mounted on the movable platform (12) and operable to determine the range of at least two satellites (18) in Earth orbit, and a source (364) of ephemerides for the satellites (18). The system also includes a processor (14c) coupled to the radar system (14) and to the source (364) of ephemerides for calculating range equations which express the geolocation of the platform relative to the satellites, and for applying a least-squares solution to determine the geolocation. This system may be supplemented by a system for determining the velocity of a movable platform (12), which supplemental system comprises a radar system (14) mounted on the movable platform (12) and operable to determine the range rate of at least two satellites (18) in Earth orbit, and also comprises a source (364) of ephemerides for the satellites (18). A processor, which may be the same processor, is coupled to the radar system and to the source (364) of ephemerides for calculating range equations which express the geolocation of the platform relative to the satellites, for applying a least-squares solution to determine the geolocation, and for, from the range rate, the velocity of the satellites as established by the ephemerides, and the lines of sight between the moving platform and the satellites, determining the velocity of the movable platform.

A system for geolocation of a ship platform (12) according to an aspect of the disclosure comprises a radar system (14) mounted on the ship platform (12) for measuring range to at least two satellites (18), a source (364) of satellite ephemerides, and a source (366) of estimate of the position of the ship platform (12). A computer (14c) is coupled to the radar, to the source of satellite ephemerides, and to the source of estimate, for (a) using the computer, calculating (315, 518, 532) the ranges to each satellite (18) from an estimate of the position of the platform, to thereby generate calculated ranges, (b) comparing (316, 420, 520, 534) the measured ranges to the calculated ranges, (c) calculating (318, 415, 522, 536) a geometry matrix, (d) using the geometry matrix, making a new estimate (320, 422, 524, 540) of the incremental position of the platform (12), and (e) and updating the estimate with the new estimate (322, 424, 526, 542) of position of the platform with the current estimate of the incremental position. Another embodiment of the system is further for determining the range rate of the satellites (18) in Earth orbit, and in this other embodiment, the computer (14c), is further for, from the range rate, the velocities of the satellites as established by the ephemerides, and the lines of sight between the ship and the satellites, determining the velocity of the movable platform.

What is claimed is:

1. A method for geolocation of a movable platform, said method comprising the steps of:

operating a radar system mounted on said movable platform;

measuring, with said radar system, a range from the movable platform to each of N satellites in Earth orbit, where N is greater than 2, and where N is the total number of range measurements made using the radar system;

providing a memory having ephemerides data for each of said N satellites;

obtaining from said memory on said movable platform, said ephemerides data for said satellites;

establishing an initial estimated position of said movable platform;

iteratively performing in a computer coupled to said memory and to said radar system, and using as input the N range measurements from the movable platform to the corresponding satellite, the steps of:

estimating a range to each of the N satellites based on the estimated position;

comparing the estimated ranges to the N range measurements obtained from the radar system;

setting up range equations which express the geolocation relative to said satellites; and updating the estimated position of the movable platform by applying a least-squares solution based on the range equations, the N range measurements and the estimated ranges; and determining the geolocation of the movable platform based on the estimated position in response to a determination that an iteration threshold has been reached.

2. A method according to claim 1, wherein said step of applying a least-squares solution includes the steps of:

receiving the estimated position; and performing computer steps of:

loading said satellite ephemeris data from said memory on said movable platform, computing a geometry matrix composed of a set of linearized range equations, and solving for an incremental position estimate.

3. A method according to claim 1, wherein determining that the iteration threshold has been reached includes one of: a) comparing the change in the estimated position with a threshold value; and b) counting the total number of iterations and comparing the number to a threshold.

4. A method according to claim 1, further comprising the steps of:

operating said radar system mounted on said movable platform to determine a range rate of said N satellites in Earth orbit; and using said computer, and from said range rates to each satellite, the velocity of each of said satellites as established by said ephemerides, and the lines of sight between said moving platform and each of said satellites, determining the velocity of the movable platform, relative to the Earth.

5. A method for geolocation of a movable platform, said method comprising the steps of:

operating a radar system mounted on said movable platform;

measuring, with said radar system, a range from the movable platform to each of N satellites in Earth orbit, where N is equal to 2, and where N is the total number of range measurements made using the radar system, wherein said movable platform is an earth-bound sea-based ship determined to be on an ellipsoid approximating the Earth's surface;

providing a memory having ephemerides data for each of said N satellites;

obtaining from said memory on said movable platform, said ephemerides data for said satellites;

establishing an initial estimated position of said movable platform;

iteratively performing in a computer coupled to said memory and to said radar system, and using as input the N range measurements from the movable platform to the corresponding satellite, the steps of:

estimating a range to each of the N satellites based on the estimated position;

comparing the estimated ranges to the N range measurements obtained from the radar system;

setting up range equations which express the geolocation relative to said satellites; and updating the estimated position of the movable platform by applying a least-squares solution based on the range equations, the N range measurements and the estimated ranges, wherein said step of applying a least-squares solution includes the steps of:

receiving the estimated position; and performing computer steps of:

loading said satellite ephemeris data from said memory on said movable platform, computing a geometry matrix composed of a set of linearized range equations, computing a Jacobian matrix relating ship latitude and longitude to three-dimensional position, and solving for an incremental position estimate; and determining the geolocation of the movable platform based on the estimated position in response to a determination that an iteration threshold has been reached.

6. A method according to claim 5, wherein the computer step of forming the initial estimate of the position further comprises determining the initial estimated position of the earth-bound sea-based ship to be $[0,0,0]^T$ in an Earth-Centered, Earth-Fixed (ECEF) coordinate system.

7. A method for geolocation of a ship platform, where the ship platform carries a radar system, a memory, and a computer, said method comprising the steps of:

using said radar system, measuring a range from the ship platform to each of N satellites in Earth orbit, where N is greater than two and where N is the total number of range measurements made using the radar;

storing on said memory, ephemerides data for each satellite of said N satellites;

loading into said computer from said memory coupled to said computer, the static ephemerides data for said satellites;

loading into said computer, an initial estimate as to the position of said ship platform, to define an estimated position;

iteratively performing the following steps using as input, the N range measurements:

using said computer, estimating ranges to each satellite based on the estimated position of said platform, to thereby generate calculated ranges;

comparing said N range measurements to said estimated ranges;

calculating a geometry matrix;

using said geometry matrix, making an estimate of the incremental position of said platform; and updating the previous estimated position with the current estimate of the incremental position, in response to a determination that an iteration threshold has not been reached.

8. A method according to claim 7, further comprising the steps of:
   using said radar system, measuring range rate to each satellite of said N Earth satellites; and
   computing at least one of (a) latitude and longitude rate and (b) three-dimensional velocity of said ship platform relative to the Earth.

9. A method according to claim 7, wherein the initial estimate as to the position of said platform loaded into said computer is $[0,0,0]^T$ in an Earth-Centered, Earth-Fixed (ECEF) coordinate system.

10. A system for geolocation of a movable platform, said system comprising:
   a radar system mounted on said movable platform configured to measure a range from the movable platform to each of N satellites in Earth orbit, where N is greater than two, and where N is the total number of range measurements made using the radar system;
   a memory storing ephemerides data for each satellite of said N satellites;
   a source of an initial estimated position of said movable platform; and
   a processor coupled to said radar system, to said initial source of the estimated position, and to said memory containing said ephemerides, said processor configured to iteratively perform, using as input, the measured ranges made using the radar, the steps of:
   calculating a set of estimated ranges from the estimated position to each satellite of the N satellites, based on the ephemerides data for each satellite of the N satellites;
   comparing the input set of measured ranges to the set of estimated ranges;
   calculating range equations which express the geolocation of the movable platform based on the comparison; and
   applying a least-squares solution based on the set of range equations to update the estimated position.

11. The system of claim 10, wherein said movable platform is an earth-bound sea-based ship, wherein the processor is further configured to receive the initial estimate of the position of said movable platform for determining geolocation of said ship, and wherein said initial estimate received is $[0,0,0]^T$ in an Earth-Centered, Earth-Fixed (ECEF) coordinate system.

12. A system for determining the velocity of a movable platform, said system comprising:
   a radar system mounted to said movable platform configured to measure a range from the movable platform to each of N satellites in Earth orbit, wherein N is greater than two and where N is the total number of range measurements and range rate measurements made by the radar system;
   a memory storing ephemerides data for each satellite in the N satellites;
   a source of an initial estimated position of said movable platform; and
   a processor coupled to said radar system, to said source of the initial estimated position, and to said memory containing said ephemerides data of each satellite of said plurality of satellites, said processor configured to iteratively perform, using as input, the N range measurements, the steps of:
   calculating range equations which express the range from estimated position of said platform relative to said satellites to determine calculated ranges,
   comparing said calculated ranges to said N measured ranges, and
   updating the estimated position by applying a least-squares solution based on the range equations, the estimated ranges and the N measured ranges, and
   from said range rate, establish the velocity of said satellites by said ephemerides, and the lines of sight between said moving platform and said satellites, determining the velocity of said movable platform relative to the Earth.

13. The system of claim 12, wherein said movable platform is an earth-bound sea-based ship, wherein the processor is further configured to receive the initial estimate of the position of said movable platform for determining geolocation of said ship, and wherein said initial estimate received is $[0,0,0]^T$ in an Earth-Centered, Earth-Fixed (ECEF) coordinate system.

14. A system for geolocation of a ship platform, said system comprising:
   a radar system mounted on said ship platform for measuring a range from the ship platform to each of N satellites in Earth orbit, wherein N is greater than 2 and where N is the total number of range measurements made using the radar system;
   a memory on said ship platform, having stored thereon, ephemerides data for each satellite of N satellites;
   a source of an initial estimated position of said ship platform;
   a computer coupled to said radar, to said memory storing said satellite ephemerides, and to said source of the initial estimated position, and configured to iteratively, using as input, the N range measurements, perform the steps of:
   (a) calculating ranges to each satellite from said estimated position of said ship platform, to thereby generate estimated ranges,
   (b) comparing said measured ranges to said estimated ranges,
   (c) calculating a geometry matrix,
   (d) using said geometry matrix, making a new estimate of position of said ship platform with the current estimate representing an incremental position of said ship platform.

15. A system according to claim 14, wherein said radar system is further configured to determine the range rate of each satellite of said N satellites in Earth orbit; and
   said computer is further configured to, from said range rates of each satellite in the N satellites, the velocities of each satellite of said N satellites as established by said ephemerides, and the lines of sight between said ship and each satellite of said N satellites, determine the velocity of said movable platform relative to the Earth.

16. The system of claim 14, wherein said movable platform is an earth-bound sea-based ship, and wherein said initial estimate of the position of said movable platform is $[0,0,0]^T$ in an Earth-Centered, Earth-Fixed (ECEF) coordinate system.

* * * * *